United States Patent [19]

Brunson et al.

[11] 4,422,243
[45] Dec. 27, 1983

[54] DUAL AXIS CAPACITIVE INCLINATION SENSOR

[75] Inventors: Amber N. Brunson; Deighton E. Brunson, both of Independence; Walter W. Ray, Jr., Kansas City, all of Mo.

[73] Assignee: Brunson Instrument Co., Kansas City, Mo.

[21] Appl. No.: 381,010

[22] Filed: May 24, 1982

[51] Int. Cl.³ .............................................. G01C 9/06
[52] U.S. Cl. ........................................ 33/366; 33/389
[58] Field of Search ................ 33/366, 365, 377, 379, 33/389, 390

[56] References Cited

U.S. PATENT DOCUMENTS

| | | | |
|---|---|---|---|
| 2,322,681 | 6/1943 | Zenor | 33/366 |
| 2,592,941 | 4/1952 | Moore | 33/366 |
| 2,711,590 | 6/1955 | Wilcox | 33/377 |
| 2,848,710 | 8/1958 | Owen | 33/377 |
| 2,936,411 | 5/1960 | Doty | 33/377 |
| 3,009,255 | 11/1961 | Robillard | 33/366 |
| 3,059,343 | 10/1962 | Kermode | 33/366 |
| 3,096,591 | 7/1963 | Higgins, Jr. et al. | 33/366 |
| 3,225,450 | 12/1965 | Stanley | 33/366 |
| 3,286,357 | 11/1966 | Grumman | 33/366 |
| 3,421,227 | 1/1969 | Turner et al. | 33/366 |
| 3,438,266 | 4/1969 | Carow et al. | 33/366 |
| 3,442,023 | 5/1969 | Remington et al. | 33/366 |
| 3,486,238 | 12/1969 | Hansen | 33/366 |
| 3,823,486 | 7/1974 | Bhat et al. | 33/366 |
| 3,906,471 | 9/1975 | Shawhan | 33/366 |
| 3,911,592 | 10/1975 | Crask | 33/378 |
| 4,022,284 | 5/1977 | Crow | 33/333 |
| 4,028,260 | 6/1977 | Zuest | 33/366 |
| 4,028,815 | 6/1977 | Buckley et al. | 33/366 |
| 4,057,661 | 11/1977 | Züst | 33/366 |
| 4,077,132 | 3/1978 | Erickson | 33/366 |
| 4,085,375 | 4/1978 | Galuschak et al. | 33/366 |
| 4,091,542 | 5/1978 | Schnied et al. | 33/333 |
| 4,094,073 | 6/1978 | Parra | 252/470 |
| 4,152,839 | 5/1979 | McDonald | 33/366 |
| 4,154,000 | 5/1979 | Kramer | 33/366 |
| 4,167,818 | 9/1979 | Cantarella et al. | 33/366 |

Primary Examiner—Willis Little
Attorney, Agent, or Firm—Litman, Day & McMahon

[57] ABSTRACT

A dual axis capacitive inclination sensor includes a flat cylindrical vial defined by a lower conductive half and an upper dielectric half with a chamber therebetween containing a dielectric liquid with a bubble therein. A top surface of the upper half has two pairs of axis capacitor plates positioned thereon in spaced relation to two mutually perpendicular horizontal inclination axes, and each of the axis plates forms a capacitor in cooperation with the lower half which functions as a common capacitor plate. Inclination of the vial about one or both of the inclination axes causes a change in the position of the bubble with respect to the capacitive system, thereby changing the capacitance between the plates. Each of the axis capacitor plates has a shape defined by a circumferentially extending web portion having inwardly directed radial portions connected at the opposite ends of the web. The radial portions are tapered in the direction toward the center of the vial in order to maximize the linearity of response of the sensor.

15 Claims, 5 Drawing Figures

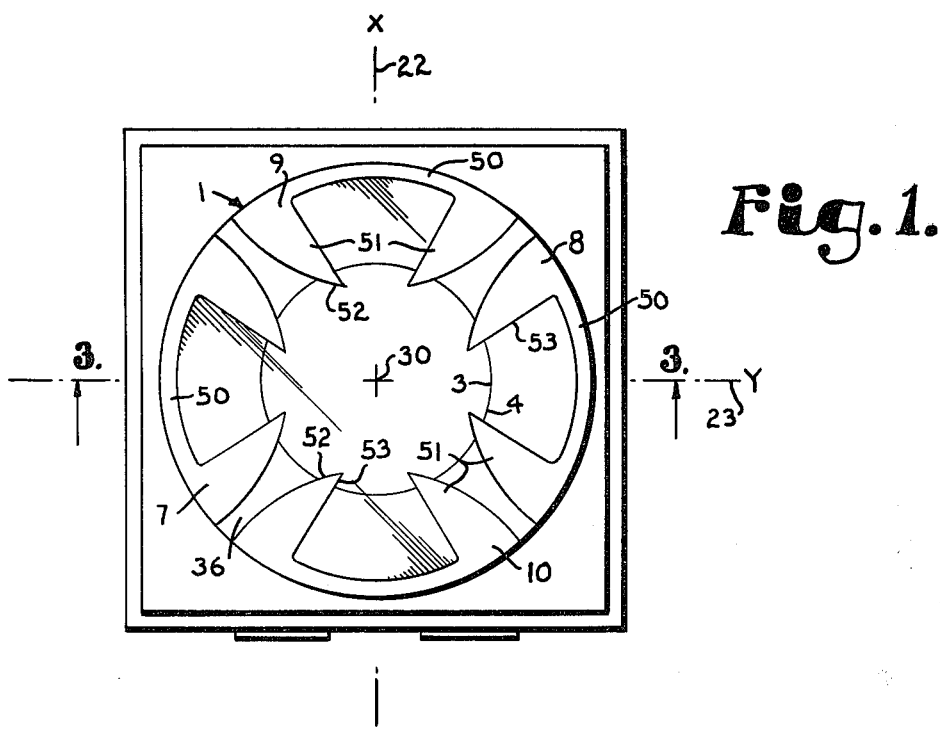
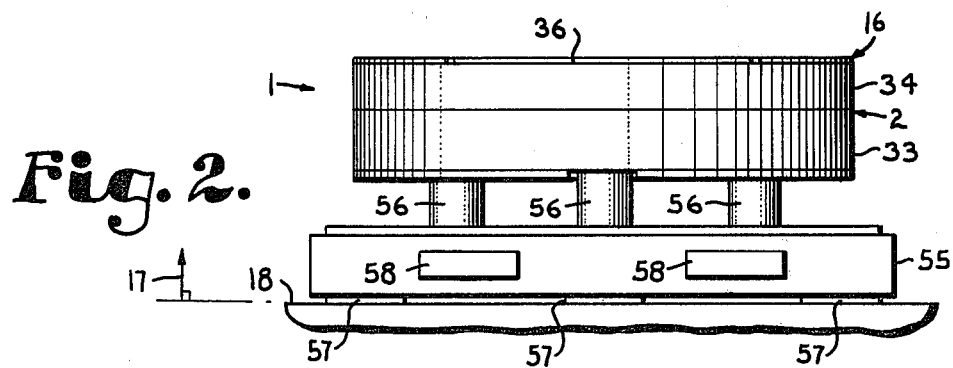
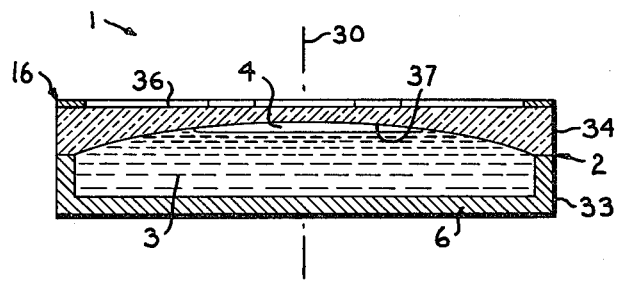

DUAL AXIS CAPACITIVE INCLINATION SENSOR

FIELD OF THE INVENTION

The present invention relates to inclination sensing instruments and, more particularly, to a dual axis capacitive inclination sensor vial.

BACKGROUND OF THE INVENTION

Instruments for determining true horizontal and vertical range from the carpenter's level and plumb bob which have been used nearly since antiquity through precise opto-mechanical instruments, such as optical transit squares, to electro-mechanical instruments such as gyroscopes. Each type of instrument is adequate for a given application with regard to required precision, speed of measurement, and convenience. The majority of the simpler inclination indicating instruments do not provide a quantitative indication of inclination, but merely whether or not a test surface is level. Such an indication is adequate for constructing relatively small structures, such as residential buildings of several stories or less. However, much greater accuracy is required for building relatively large structures such as skyscrapers, oceangoing vessels, and the like. For the greater accuracy required in building relatively large structures, optical tooling instruments are often used, such as optical transit squares, by means of which critical points, lines, and planes are observed through precise telescopes and related to reference lines or planes. While much greater accuracy can be achieved with such instruments, the actual use of such instruments can be very time consuming. In certain circumstances, there is a need for an inclination sensing instrument which reads out directly and quantitatively without sacrificing accuracy.

Heretofore, inclination sensing instruments have been devised which employ conductance, inductance, and capacitance as operating parameters. Other instruments have been devised which employ optical and gyroscopic principles. One factor which must be considered in each type of instrument is linearity of response whereby, as the inclination of the instrument is varied in constant increments, a signal property such as current, voltage, or frequency also varies in constant increments. One approach to the linearity problem is non-linear calibration, for example, on an analog type meter scale. An analogy of this approach is the non-linear scale found on conventional analog ohmmeters. Another approach to the non-linearity problem is the use of circuitry having non-linear response in the reverse direction to the non-linearity of the sensor signal to compensate therefor. This is somewhat analogous to an audio compression circuit wherein the gain of the circuit is an inverse function of the input level.

SUMMARY OF THE INVENTION

The present invention seeks to overcome the non-linearity problem in an inclination sensing instrument by means of the structural configuration thereof. A two axis bubble vial is disclosed wherein capacitor plates of a novel configuration provide a substantially linear variation in the voltage level of a pair of signals as the vial is inclined within a limited range of inclination.

OBJECTS OF THE INVENTION

The principal objects of the present invention are: to provide an improved instrument for determining the inclination of a surface with respect to two mutually perpendicular horizontal axes which are defined in relation to the direction of gravitational force; to provide particularly a two axis bubble vial wherein the capacitance between capacitor plates thereof is varied in proportion to the inclination of the vial; to provide such a vial for use in cooperation with bridge circuits such that the voltage levels of a pair of output signals therefrom are varied in proportion to the inclination of the vial about the horizontal axes; to provide such a vial wherein the capacitor plates have a configuration such that inclination of the vial in constant angular increments results in variation in the voltage levels of the signals from the bridge circuits in constant increments within a selected range of inclinations; to provide such a vial wherein errors due to friction, viscosity, and inertia are minimized; and to provide such a dual axis capacitive inclination sensing vial which is economical to manufacture, accurate in operation, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a top plan view of an inclination sensing vial embodying the present invention and illustrates the configuration of capacitor plates employed thereon.

FIG. 2 is a side elevational view of the sensor vial mounted on a base member.

FIG. 3 is a sectional view taken on line 3—3 of FIG. 1 and illustrates details of the sensor vial.

DETAILED DESCRIPTION OF THE PREFERRED EMBODIMENT

Figure 4:
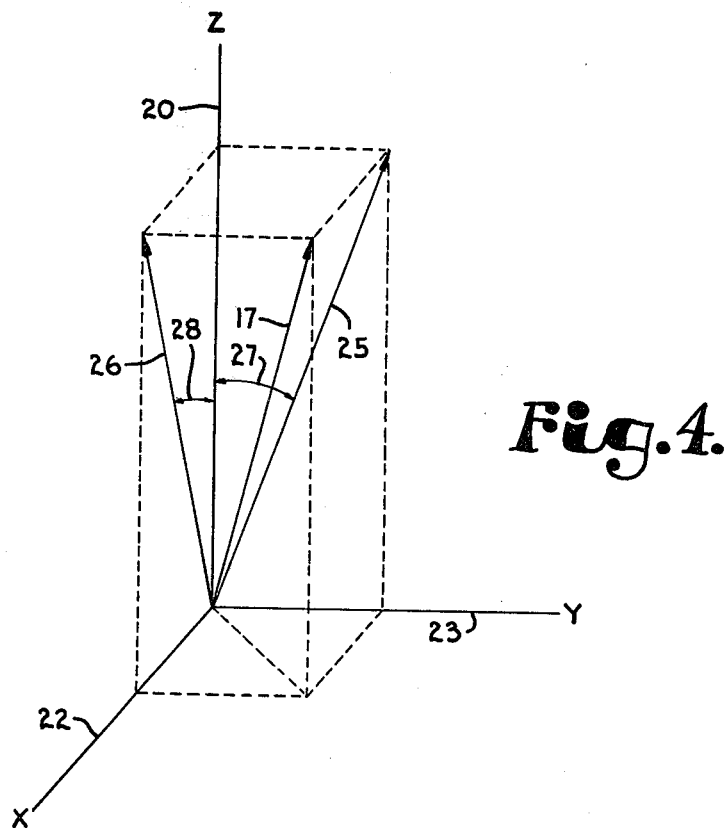
FIG. 4 is a perspective view illustrating the principal parameters of a rectangular Cartesian coordinate system.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a dual axis capacitive inclination sensor vial embodying the present invention. The sensor vial 1 generally comprises a vessel 2 for containing a liquid 3 with a bubble 4 therein. A common capacitor plate 6 is positioned on one side of the vessel 2, and axis capacitor plates 7, 8, 9, and 10 are positioned on the opposite side of the vessel. Upon inclination of the vial 1, the liquid 3 and bubble 4 move with respect to the capacitive system thereby changing the capacitance between respective capacitors thereof. The change in capacitance is detected by circuitry 12 (FIG. 5), and angle readings are provided on a display device 14.

Referring to FIG. 4, the sensor vial 1 is operative to vary the capacitance between respective axis plates 16 and the common plate 6 in proportion to the inclination of a normal vector 17 of a surface 18, FIG. 2, in relation to a vertical or Z axis 20. The two mutually perpendicular hotizontal axes, X axis 22 and Y axis 23, together with the vertical Z axis 20 define a three dimensional rectangular Cartesian coordinate system. A normal vector is used to specify the spatial orientation of a surface or plane, being normal or perpendicular thereto, and often has a magnitude of unity. The normal vector 17 is resolved into a first component vector 25 in the Y-Z plane and a second component vector 26 in the X-Z plane. The angle readings which are displayed on the display device 14 are respectively a first angle 27 and a second angle 28. The angle 27 is the angle between the first component vector 25 and the Z axis 20 and, further, represents the inclination of the vial 1 about the X axis 22. Similarly, the angle 28 is the angle between the second component vector 26 and the Z axis and represents the inclination of the vial 1 about the Y axis 23.

The illustrated vial 1 is generally a hollow, flat, cylindrical or discoidal vessel 2 having a cylinder or vial axis 30 corresponding to and parallel to or colinear with the surface vector 17. The X and Y horizontal axes 22 and 23 intersect the vial axis 30 at a position preferably below the vial 1. The vial 1 is sealed and contains a quantity of the liquid 3 and the gas bubble 4 of predetermined volume relative to the volume of the vial at a selected temperature. The liquid and bubble are acted upon by gravity in the direction of the Z axis 20. Therefore, inclination of the vial 1 about either or both of the axes 22 and 23 causes the liquid 3 to move in relation to the vial axis 30 thereby displacing the bubble 4 in relation to the capacitor plates 16 and 6.

The vial 1 is defined by a lower half or pan portion 33 formed of conductive material, such as copper, and an upper half or cap portion 34 formed of an insulator, such as glass or a plastic. A lower wall of the pan portion 33 defines the common capacitor plate 6 and an upstanding circumferential wall provides for attachment of the cap 34 to the pan 33. The axis capacitor plates 16 are positioned on an upper surface 36 of the cap 34. As illustrated in FIG. 3, a lower surface 37 of the cap portion 34 has a concave spherical shape in order to positively position the bubble 4 in the center of the vial 1 when the vial is in a horizontal orientation and so that distortion of the shape of the bubble is minimized as the vial 1 is inclined throughout its useful range. The pair of axis plates 7 and 8 are associated with the X axis 22, and the plates 7 and 8 are positioned on opposite sides thereof. Similarly, the pair of axis plates 9 and 10 are associated with and positioned on opposite sides of the Y axis 23. The axis plates 16 are spaced symmetrically about the vial axis 30. Each of the axis capacitor plates forms a capacitor in cooperation with the common capacitor plate 6 and the dielectric media of the cap 34, the liquid 3, and the bubble 4. Inclination of the vial 1 causes movement of the liquid 3, and therefore the bubble 4, in response to gravity and in turn causes the respective capacitances between the capacitor plates 16 and 6 to change in proportion to the degree of inclination. Such changes are measured and quantitatively related to the direction of inclination.

Figure 5:
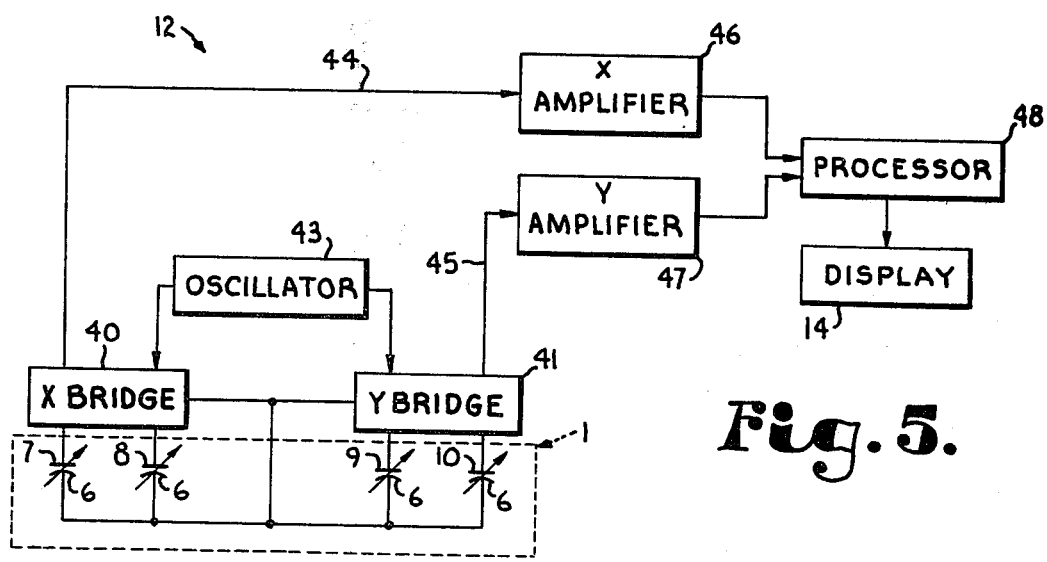
FIG. 5 is a block diagram illustrating exemplary circuitry for use with the sensor vial of the present invention.

Referring to FIG. 5, the capacitor plates 6 and 16 are preferably connected in bridge circuits 40 and 41. The X bridge circuit 40 has the axis plates 7 and 8 connected therein, and the Y bridge circuit 41 has the axis plates 9 and 10 connected therein. The bridge circuits 40 and 41 may be Maxwell bridges, Wien bridges, or other types of AC bridge circuits. Such bridge circuits are often driven or excited by an oscillator 43 and are initially balanced such that changes in capacitance unbalance the bridge circuit thereby causing a change in the frequency of an output signal therefrom or, if the bridge circuit is a rectifying bridge circuit, causes a change in the voltage level of the output signal. As connected to the sensor vial 1, the X and Y bridge circuits 40 and 41 are balanced in the horizontal position. Inclination of the vial 1 about the X axis 22 causes unbalancing of the X bridge circuit 40 such that a proportionate change in a signal property, such as voltage level, is effected on an output line 44 of the X bridge 40. Similarly, inclination of the vial 1 about the Y axis 23 effects a change in the voltage level on the output line 45 of the Y bridge 41. The output lines 44 and 45 may include means such as respective amplifiers 46 and 47 to increase the signal levels thereon and for scaling purposes.

The circuitry 12 may include a signal processor 48 for further processing of the output signals from the bridges 40 and 41. The signal processor 48 may be a switching system for selecting the signal from either the X bridge 40 or Y bridge 41. Alternatively, the processor 48 may include analog-to-digital conversion and a computer. The processor 48 feeds a display signal to the display device 14 which may be an analog type meter or a digital display.

Referring to FIG. 1, the shape of each of the axis capacitor plates 7-10 was developed so that the variation of the voltage of the output signals of the bridge circuits would be substantially linear as the vial 1 is inclined in regular increments through the useful range of the vial 1. Each axis plate includes an elongated web portion 50 extending in an overall direction which is generally parallel to the horizontal inclination axis 22 or 23 with which the particular axis plate is associated. The web portion 50 of each of the illustrated axis plates 16 extends over an arc of less than 90 degrees about the vial axis 30 and is positioned at a first selected radius from the vial axis 30. A pair of radial or end portions 51 are connected at opposite ends of each web portion 50, extend inwardly toward the vial axis 30, and terminate at a second selected radius therefrom. Preferably, each radial portion 51 is defined by an outside edge 52 having the shape of an arc of a circle and an inside edge 53 which is substantially a straight line. Each radial portion tapers substantially to a point. The axis plates 16 may be sheet metal or foil of the proper shape. Preferably, the axis plates 16 are formed by plating the upper surface 36 of the cap portion 34 of the vial, as with copper. The plated surface is then masked and etched in the manner of printed circuit boards for precision of shape and position.

The illustrated vial 1 is mounted on a base member 55 by means of legs 56. The legs 56 are preferably constructed of a material having a very low coefficient of thermal expansion. The base member 55 may include bottom leveling pads 57 which are ground to close tolerances such that the lower surfaces thereof are substantially in a single plane. Further, the base member 55 may include side pads 58 similar to the bottom pads 57 for accurate lateral placement of the sensor vial 1. In normal use, the vial 1 is enclosed in a housing (not shown) which may be attached to the base member 55.

The type of liquid 3 which is contained in the vial 1 is chosen with regard to the environment in which the vial 1 will be used. The factors which must be considered include the dielectric constant of the liquid, the viscosity of the liquid at the temperature which the vial 1 will be used at, and the dimensional stability of the liquid over the range of temperatures at which the vial 1 will be used. Similar considerations must be made concerning the gas bubble 4. Certain alcohols and light oils would be suitable for the liquid 3. It is desirable for the liquid 3 and bubble 4 to have substantially different dielectric constants so that movement of the bubble in relation to the capacitor plates 6 and 16 will cause a measurable change in the capacitance between the respective plates.

It is to be understood that while certain forms of the present invention have been illustrated and described herein, it is not to be limited to the specific forms or arrangements of parts described and shown.

What is claimed and desired to secure by Letters Patent is:

1. A capacitor device comprising:
   (a) first capacitor plate means;
   (b) a second capacitor plate positioned in spaced relation to said first capacitor plate means and including:
      (1) an elongated, planar conductive web portion having opposite edges therealong and opposite ends; and
      (2) a pair of substantially symmetrical, planar conductive end portions extending away from one edge of said web portion at opposite ends thereof; and
   (c) dielectric means positioned between said first capacitor plate means and said second capacitor plate.

2. The capacitor plate set forth in claim 1 wherein each of said end portions is tapered in the direction away from said web portion.

3. The capacitor plate set forth in claim 1 wherein:
   (a) said web portion extends arcuately; and
   (b) said end portions extend in mutually converging relation.

4. The capacitor plate set forth in claim 3 wherein each of said end portions is tapered in the direction away from said web portion.

5. A capacitive inclination sensing vial for varying capacitance in proportion to the inclination thereof and comprising:
   (a) a vessel for containing a fluid, said vessel having associated therewith a horizontal axis about which inclination of said vial is to be sensed and a vial axis intersecting said inclination axis and perpendicular thereto, said vial axis being vertical when said vial is placed on a horizontal surface;
   (b) a dielectric fluid contained and movable within said vessel;
   (c) a common capacitor plate positioned on said vessel on one side of said fluid;
   (d) an axis capacitor plate positioned on said vessel on an opposite side of said fluid from said common plate and defining a capacitor in cooperation with said common plate, the position of said fluid in relation to said axis plate and said common plate changing in response to the inclination of said vial about said inclination axis thereby changing the capacitance of said capacitor in proportion to the angle of said inclination; and
   (e) said axis plate having a shape defined by:
      (1) a web portion spaced from said vial axis and extending in a direction which is generally parallel to said inclination axis; and
      (2) a pair of end portions connected at opposite ends of said web portion and extending generally toward said vial axis.

6. The vial set forth in claim 5 wherein said end portions of said axis are tapered in the direction toward said vial axis.

7. The vial set forth in claim 5 wherein:
   (a) said common plate extends on opposite sides of said vial axis; and
   (b) said vial includes a pair of axis plates substantially identical to said axis plate, said axis plates being positioned in symmetrical opposing relation across said vial axis.

8. The vial axis set forth in claim 5 wherein:
   (a) said inclination axis is a first inclination axis;
   (b) said vessel has a second horizontal inclination axis associated therewith, said second inclination axis being perpendicular to said first inclination axis and intersecting same and said vial axis;
   (c) said common plate extends on opposite sides said vial axis in the directions of said first and second inclination axes; and
   (d) said vial includes two pairs of axis plates substantially identical to said axis plate, each pair of said axis plates being associated with a respective one of said inclination axes, being positioned on said vessel in opposing relation across said vial axis, and being spaced from a plane defined by said vial axis and the associated inclination axis, thereby providing for inclination sensing about said first and second inclination axes.

9. The vial set forth in claim 8 wherein:
   (a) each of said web portions extends arcuately;
   (b) said end portions of each axis plate extend in mutually converging relation; and
   (c) said end portions taper in said direction toward said vial axis.

10. The vial set forth in claim 9 wherein each of said end portions is defined by an inner edge and an outer edge and wherein:
    (a) said inner edge is substantially a straight line; and
    (b) said outer edge is substantially an arc of a circle.

11. The vial set forth in claim 5 wherein said dielectric fluid includes:
    (a) a dielectric liquid;
    (b) a gas bubble in said liquid; and
    (c) said liquid and said bubble having substantially different dielectric constants.

12. A dual axis capacitive inclination sensing bubble vial for use with circuit means to provide a pair of electrical signals proportional in level respectively to the inclination of said vial with respect to two mutually perpendicular horizontal inclination axes comprising:
    (a) a vessel containing a liquid with a bubble therein, said liquid and said bubble having substantially different dielectric constants, said vessel having a vial axis which is vertical when said vessel is placed on a horizontal surface;
    (b) a common capacitor plate positioned on one side of said vessel perpendicular to said vial axis;

(c) two pairs of axis capacitor plates positioned in parallel spaced relation to said common plate on an opposite side of said vessel with said liquid and bubble between said common plate and said axis plates, each of said pairs of axis plates being associated with a respective one of said horizontal axes;

(d) the axis plates of each pair being positioned in symmetrical relation on opposite sides of said vial axis and on opposite sides of the horizontal axis associated with said pair whereby inclination of said vial about the associated horizontal axis causes a portion of said bubble to intervene between said common plate and one of said pair of axis plates, thereby changing the capacitance therebetween; and (e) each axis capacitor plate having a shape defined by:
  (1) an outward circumferential web portion extending over an arc of less than 90 degrees about said vial axis and positioned at a first radius therefrom; and
  (2) a pair of radial portions connected at opposite ends of said web portion and extending generally toward said vial axis to a second radius therefrom.

13. The vial set forth in claim 12 wherein each of said radial portions of said axis plate is generally tapered toward said vial axis.

14. The vial set forth in claim 12 wherein each of said radial portions of said axis capacitor plate is defined by an inner edge and an outer edge and wherein:
  (a) said inner edge is substantially a straight line; and
  (b) said outer edge is substantially of an arc of a circle.

15. The vial set forth in claim 12 wherein said vial includes:
  (a) a lower conductive pan having a lower wall and an upstanding circumferential wall, said pan constituting said common capacitor plate;
  (b) an upper dielectric cap sealingly attached to said circumferential wall to contain said liquid and bubble therein, said cap having a planar upper surface and a concave spherical lower surface; and
  (c) said axis capacitor plates being positioned on said upper surface of said cap.

* * * * *